(12) United States Patent
    Kuribayashi

(10) Patent No.:  US 12,617,137 B2
(45) Date of Patent:       May 5, 2026

(54) METHOD AND DEVICE FOR MANUFACTURING BENT RESIN PIPE

(71) Applicant: THE YOKOHAMA RUBBER CO., LTD., Hiratsuka (JP)

(72) Inventor: Nobuaki Kuribayashi, Hiratsuka (JP)

(73) Assignee: The Yokohama Rubber Co., Ltd., Kanagawa (JP)

( * ) Notice: Subject to any disclaimer, the term of this patent is extended or adjusted under 35 U.S.C. 154(b) by 0 days.

(21) Appl. No.: 18/705,746

(22) PCT Filed: Aug. 22, 2022

(86) PCT No.: PCT/JP2022/031503
    § 371 (c)(1),
    (2) Date: Apr. 29, 2024

(87) PCT Pub. No.: WO2023/135848
    PCT Pub. Date: Jul. 20, 2023

(65) Prior Publication Data
    US 2024/0326304 A1      Oct. 3, 2024

(30) Foreign Application Priority Data
    Jan. 13, 2022   (JP) ................................. 2022-003815

(51) Int. Cl.
    B29C 45/17          (2006.01)
    B29C 45/26          (2006.01)
    (Continued)

(52) U.S. Cl.
    CPC ...... B29C 45/1706 (2013.01); B29C 45/1704 (2013.01); B29C 45/261 (2013.01);
    (Continued)

(58) Field of Classification Search
    CPC ........... B29C 45/1704; B29C 45/1706; B29C 45/261; B29C 2045/1707;
    (Continued)

(56) References Cited

U.S. PATENT DOCUMENTS 3,763,293 A * 10/1973 Nussbaum .......... B29C 44/3419
                                                          264/DIG. 83
5,902,541 A *  5/1999 Imai .................... B29C 45/1704
                                                          264/572
(Continued)

FOREIGN PATENT DOCUMENTS

JP        H04267124      *  9/1992
JP        H07-164465 A      6/1995
          (Continued)

OTHER PUBLICATIONS

Machine translation of JPH04267124A, Sakaida et al., originally published 1992 (Year: 1992).*
(Continued)

*Primary Examiner* — Susan D Leong
*Assistant Examiner* — Jennifer L Groux
(74) *Attorney, Agent, or Firm* — Carrier, Shende & Associates P.C.; Joseph P. Carrier; Fulchand P. Shende

(57)          ABSTRACT

A production method and device for a curved resin pipe via resin injection molding that uses an assist material. An inner curve part and/or an outer curve part of a pre-selected curved section of a cavity which is formed in a mold is configured from a temperature-adjustable piece section. After molten resin is injected into the cavity from an injection molding device, the temperature of the piece section is controlled by a control unit such that the inner curve part has a lower temperature than the outer curve part, and an assist material is injected into the cavity from an assist material injection unit and is passed through the cavity so as to form a pipe path. The resin remaining in the cavity is cured to produce a curved resin pipe.

19 Claims, 14 Drawing Sheets

(51) Int. Cl.

| | | |
|---|---|---|
| *B29C 45/73* | (2006.01) | |
| *B29C 45/78* | (2006.01) | |
| *B29L 23/00* | (2006.01) | |

(52) U.S. Cl.
CPC ...... *B29C 45/78* (2013.01); *B29C 2045/1719* (2013.01); *B29C 2045/7343* (2013.01); *B29K 2905/00* (2013.01); *B29L 2023/004* (2013.01); *B29L 2023/22* (2013.01)

(58) Field of Classification Search
CPC .... B29C 2045/1709; B29C 2045/1717; B29C 2045/1719; B29C 2045/7343; B29C 2045/735; B29L 2023/004; B29L 2023/22
See application file for complete search history.

(56) References Cited

U.S. PATENT DOCUMENTS

| | | | |
|---|---|---|---|
| 2006/0051451 A1* | 3/2006 | Hutchinson ........... | B29C 33/046 425/552 |
| 2014/0183774 A1 | 7/2014 | Ezure et al. | |
| 2016/0059461 A1* | 3/2016 | Altonen .............. | B29C 45/0025 264/40.6 |

FOREIGN PATENT DOCUMENTS

| | | | | |
|---|---|---|---|---|
| JP | H07-299838 A | | 11/1995 | |
| JP | H0825397 A | * | 1/1996 | |
| JP | H08-281690 A | | 10/1996 | |
| JP | H09183166 A | * | 7/1997 | |
| JP | H10-296733 A | | 11/1998 | |
| JP | H11-309740 A | | 11/1999 | |
| JP | 2003-181868 A | | 7/2003 | |
| JP | 2012-025090 A | | 2/2012 | |
| JP | 2017-154477 A | | 9/2017 | |
| JP | 2020-082621 A | | 6/2020 | |
| JP | 2020-082622 A | | 6/2020 | |
| JP | 2021-084375 A | | 6/2021 | |

OTHER PUBLICATIONS

Lin, et al., Using differential mold temperatures to improve the residual wall thickness uniformity around curved sections of fluid assisted injection molded tubes, International Communications in Heat and Mass Transfer, 36, 5, 2009:491-497, https://doi.org/10.1016/j.icheatmasstransfer.2009.02.009 (Year: 2009).*

Kuang, T.-Q., Xu, B.-P., Zhou, G.-F. and Turng, L.-S. (2015), Numerical simulation on residual thickness of pipes with curved sections in water-assisted co-injection molding. J. Appl. Polym. Sci., 132, 42468, doi: 10.1002/app.42468 (Year: 2015).*

Espacenet machine translation of Ebisawa et al., JPH0825397A (originally published 1996) (Year: 1996).*

* cited by examiner

METHOD AND DEVICE FOR MANUFACTURING BENT RESIN PIPE

TECHNICAL FIELD

The present invention relates to a method and a device for manufacturing a bent resin pipe and particularly relates to a method and a device for manufacturing a bent resin pipe that can more reliably correct uneven thickness of a bent portion in manufacturing the bent resin pipe by resin injection molding using an assist material, such as a gas assist molding method.

BACKGROUND ART

A known gas assist molding method includes, in molding a resin pipe by resin injection molding, injecting molten resin into a mold and subsequently injecting a high-pressure gas, such as nitrogen gas, into the mold (see, for example, Patent Document 1). Instead of the high-pressure gas, water, a metal ball, or a resin ball may be injected, as an assist material, into the mold at high pressure.

When a bent resin pipe is manufactured by resin injection molding using an assist material, the assist material injected into a cavity of a mold tends to pass through a bent portion of the cavity along the shortest route. Thus, the injected assist material passes through the bent portion of the cavity while being unevenly distributed on the inner side of the bend, and the thickness of the resin at a bent inner portion becomes thinner than that at a bent outer portion, resulting in uneven thickness. Accordingly, it becomes difficult for the manufactured bent resin pipe to have pressure resistance to withstand a preset target internal pressure. In response to this, providing a rib formation portion at the bent inner portion of the cavity and forming a rib at the bent inner portion of the manufactured bent resin pipe to reinforce the inner portion to have pressure resistance is proposed (see Patent Document 2). Unfortunately, this proposed method causes the bent inner portion of the bent resin pipe to remain relatively thin and have a shape in which the rib that is essentially unnecessary protrudes. Thus, there is room for improvement in reliably correcting the uneven thickness of the bent portion.

CITATION LIST

Patent Literature

Patent Document 1: JP 2003-181868 A
Patent Document 2: JP 2020-82621 A

SUMMARY OF INVENTION

Technical Problem

An object of the present invention is to provide a method and a device for manufacturing a bent resin pipe that can more reliably correct uneven thickness of a bent portion in manufacturing the bent resin pipe by resin injection molding using an assist material, such as a gas assist molding method.

Solution to Problem

To achieve the above object, a method for manufacturing a bent resin pipe according to an embodiment of the present invention includes manufacturing a bent resin pipe by injecting molten resin into a cavity that extends while bending and is formed in a mold, subsequently injecting an assist material into the cavity, and curing the molten resin injected. In the method, in injecting the assist material into the cavity, a bent inner portion of a pre-selected bent portion of the cavity may be caused to have a lower temperature than a bent outer portion of the pre-selected bent portion.

A device for manufacturing a bent resin pipe according to an embodiment of the present invention includes a mold in which a cavity that extends while bending is formed, an injection molding machine configured to inject molten resin into the cavity, and an assist material injection unit configured to inject an assist material into the cavity into which the resin is injected. In the device, at least one of a bent inner portion or a bent outer portion of a pre-selected bent portion of the cavity may be made up of a piece portion whose temperature is adjustable, a control unit configured to control a temperature of a piece portion may be included, and controlling, in injecting the assist material into the cavity, the temperature of the piece portion from the control unit may cause the bent inner portion to have a lower temperature than the bent outer portion.

Advantageous Effects of Invention

According to an embodiment of the present invention, in injecting an assist material into a cavity into which molten resin has been injected, a bent inner portion of a pre-selected bent portion of the cavity is caused to have a lower temperature than a bent outer portion. This causes, when the injected assist material passes through, the injected molten resin to be harder at the bent inner portion than at the bent outer portion. For this reason, even if the assist material tends to be unevenly distributed to the bent inner portion when passing through the bent portion, the molten resin filled in the bent inner portion is less likely to be removed (less likely to be scraped away) by the passing assist material. As a result, uneven thickness of the bent portion can be more reliably corrected.

DESCRIPTION OF EMBODIMENTS

Figure 1:
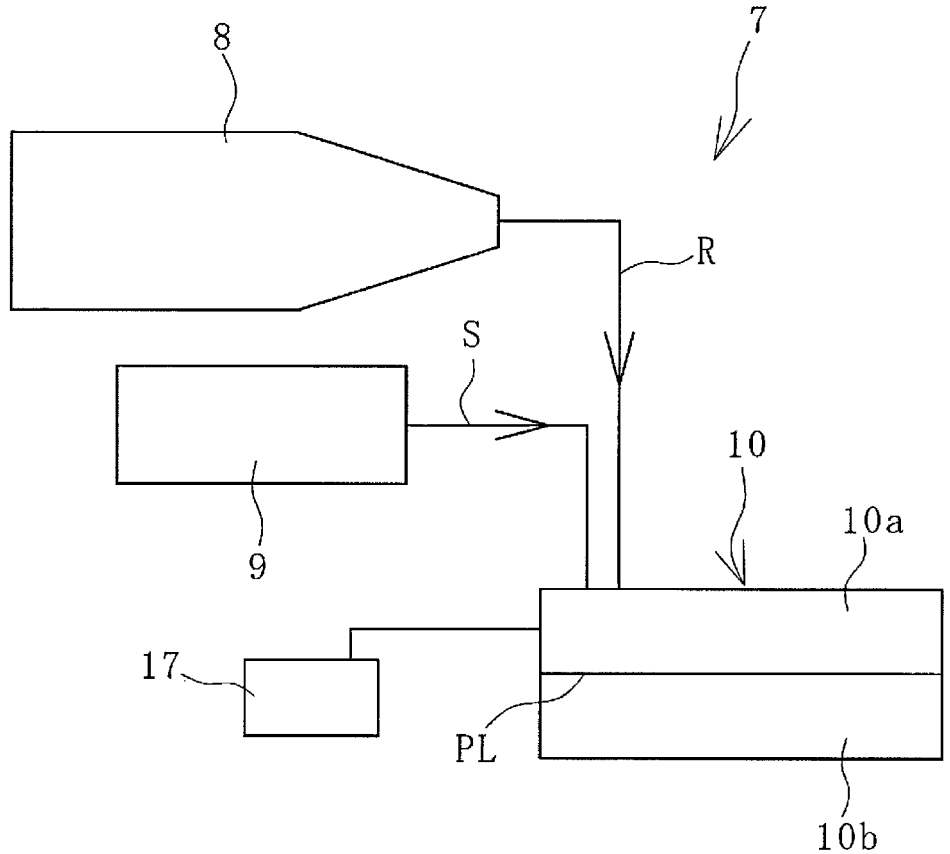
FIG. 1 is an explanatory diagram illustrating a manufacturing device for a bent resin pipe according to an embodiment of the present invention.

A method and a device for manufacturing a bent resin pipe according to an embodiment of the present invention will be described based on an embodiment illustrated in the drawings.

An embodiment of a manufacturing device 7 for a bent resin pipe illustrated in FIGS. 1 to 4 includes a mold 10, an injection molding machine 8 that injects molten resin R into a cavity 11 of the mold 10, and an assist material injection unit 9 that injects an assist material S into the cavity 11. A part of the mold 10 is made up of a piece portion 15 whose temperature is adjustable and includes a control unit 17 for controlling the temperature of the piece portion 15.

Figure 7:
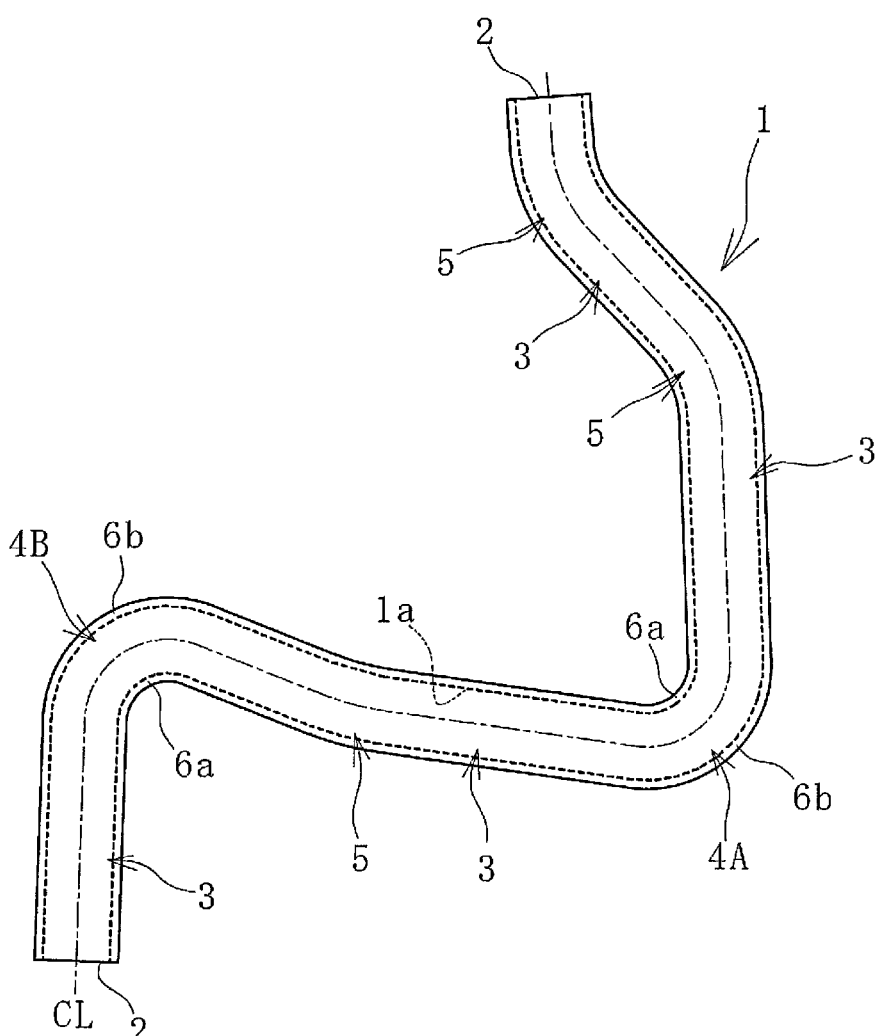
FIG. 7 is an explanatory diagram illustrating, in a plan view, the manufactured bent resin pipe according to an embodiment of the present invention.
Figure 8:
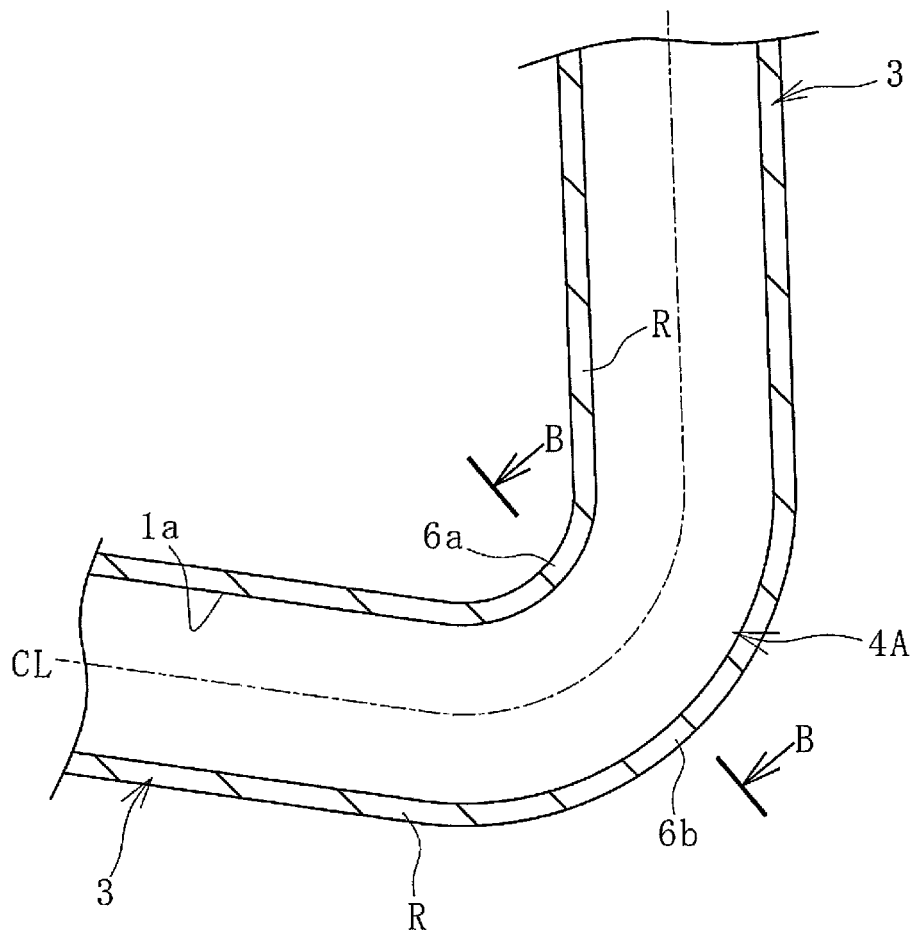
FIG. 8 is an explanatory diagram illustrating the inside of the bent resin pipe as a partially enlarged view of FIG. 7.
Figure 9:
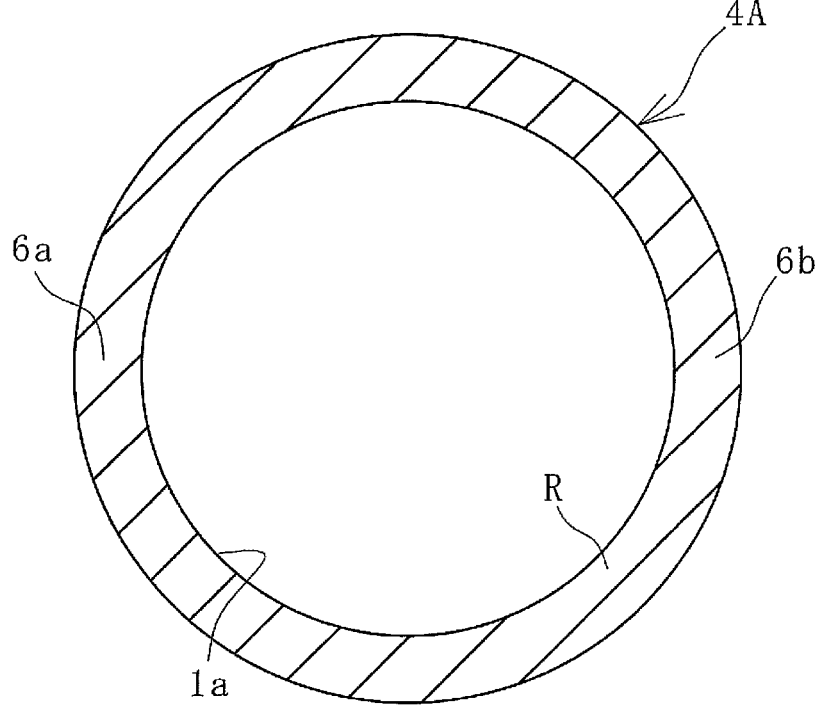
FIG. 9 is a cross-sectional view taken along a line B-B of FIG. 8.

A bent resin pipe 1 illustrated in FIGS. 7 to 9 is manufactured using the manufacturing device 7. The bent resin pipe 1 is a cylindrical body extending while including bent portions 4 (4A, 4B) having a smaller radius of curvature and bent portions 5 having a larger radius of curvature, and also including a linear portion 3. Both ends in the longitudinal direction of a pipe passage l*a* of the bent resin pipe 1 are formed as opening portions 2. A dot-dash line CL in the drawings indicates a center line passing through the center of a transverse cross-section of the pipe passage l*a*. The bent resin pipe 1 may not include the linear portion 3, and a number of the bent portions 4 and 5 is not limited.

As the injection molding machine 8, an injection molding machine having various known specifications for injecting the thermoplastic resin R can be used. As the resin R to be used, an appropriate type is selected according to the performance and the like required for the bent resin pipe 1 to be manufactured. For example, when manufacturing the bent resin pipe 1 for an air conditioner to be mounted on an automobile, for example, polyamide, polyphenylene sulfide, or the like is used as the resin R.

As the assist material injection unit 9, an assist material injection unit having various known specifications for injecting the assist material S into the cavity 11 can be used. The assist material S to be used may be a known material. An appropriate material is selected from, according to the shape and the like of the bent resin pipe 1 to be manufactured, a gas such as nitrogen gas, a liquid such as water, and a solid such as a metal ball or a resin ball.

The cavity 11 that extends while bending is formed in the mold 10. According to this embodiment, the mold 10 is made up of a pair of molds 10*a* and 10*b* assembled. The respective molds 10*a* and 10*b* are closed and opened with a parting line PL acting as a boundary.

A runner 18*a* connected to the cavity 11 via a gate 18*b* is formed in the mold 10. The runner 18*a* is connected to nozzles of the injection molding machine 8 and the assist material injection unit 9 via sprues formed in the mold 10. A discharge portion for the assist material S injected into the cavity 11 is also provided in the mold 10.

The cavity 11, which forms a hollow, extends while bending in a shape identical to that of the bent resin pipe 1 to be manufactured. At least one of a bent inner portion 14*a* or a bent outer portion 14*b* of a pre-selected bent portion 12 (12A, 12B) of the cavity 11 is made up of the piece portion 15 whose temperature is adjustable. Specifically, the mold

10 includes the piece portion 15 incorporated into at least one of the bent inner portion 14*a* or the bent outer portion 14*b* of the pre-selected bent portion 12 (12A, 12B). As shown in the drawings, each of the piece portions includes a surface defining only part of the cavity in an extension direction of the cavity formed in the corresponding mold, and particularly in a localized area of the mold only at the bent inner portion 12A or the bent outer portion 12B of the cavity, and each piece portion is disposed only in the localized area of the mold directly adjacent to the bent inner portion 12A or the bent outer portion 12B of the cavity.

In this embodiment, only the bent inner portion 14*a* is made up of the piece portion 15. The piece portion 15 is made up of a pair of piece portions 15*a* and 15*b* corresponding to the pair of molds 10*a* and 10*b*. The one piece portion 15*a* is incorporated into the one mold 10*a*, and the other piece portion 15*b* is incorporated into the other mold 10*b*.

A configuration in which, of the bent inner portion 14*a* and the bent outer portion 14*b*, only the bent outer portion 14*b* is made up of the piece portion 15 can be adopted, or a configuration in which the bent inner portion 14*a* and the bent outer portion 14*b* are made up of the piece portion 15 can be adopted. Since the bent portions 12A and 12B have the same configuration, the bent portion 12A is illustrated in detail as representative in the drawings.

The bent portion 12 (12A, 12B) of the cavity 11 corresponds to the bent portion 4 (4A, 4B) having the smaller radius of curvature of the bent resin pipe 1, and the bent portion 13 of the cavity 11 corresponds to the bent portion 5 having the larger radius of curvature of the bent resin pipe 1. Thus, the bent portion 12 having a relatively small radius of curvature and bend angle is selected, and at least part of the selected bent portion 12 is made up of the piece portion 15.

A bend angle Ca of the bent inner portion 14*a* of the selected bent portion 12 is, for example, 90° or less, and is more preferably 75° or less. A radius of curvature Cr of the bent inner portion 14*a* is, for example, 20 mm or less, and is more preferably 10 mm or less.

The piece portion 15 constitutes, for example, an approximate range of 15 mm or more and 20 mm or less in the front-rear direction (extension direction of the cavity 11) of a bend apex P of the bent inner portion 14*a*. If the range (length) constituted by the piece portion 15 is too small, the uneven thickness of the bent resin pipe 1 at the bent portion 4 cannot be corrected. On the other hand, if the range (length) constituted by the piece portion 15 is too large, the uneven thickness is likely to occur at portions other than the bent portion 4. The range constituted by the piece portion 15 (such as the range in the extension direction of the cavity 11) is set to an appropriate value by performing a preliminary test or computer simulation.

The piece portion 15 is preferably formed of a metal having higher thermal conductivity than a metal that forms portions of the mold 10 other than the piece portion 15. Portions of the mold 10 other than the piece portion 15 are formed of, for example, general carbon steel, and the piece portion 15 is formed of, for example, beryllium copper alloy.

A known computer is used as the control unit 17 for controlling the temperature of the piece portion 15. For example, a dedicated flow path through which a medium such as water flows is formed in the piece portion 15, and the temperature of the piece portion 15 is controlled to a desired temperature range by adjusting the temperature of the medium as a result of a temperature controller of the medium being controlled by the control unit 17. In this embodiment, water is used as the medium, and the cooling temperature of the water is adjusted by the control unit 17 to cool the piece portion 15 to the desired temperature range.

More specifically, in injecting the assist material S into the cavity 11, the control unit 17 controls the temperature of the piece portion 15 to cause the bent inner portion 14a to have a lower temperature than the bent outer portion 14b. Causing the thermal conductivity of the piece portion 15 to be higher than that of the other portions of the mold 10 is advantageous to rapidly increase a temperature difference between the piece portion 15 and the other portions (the bent outer portion 14b).

Next, an example of procedures of a method for manufacturing the bent resin pipe according to an embodiment of the present invention will be described.

Figure 2:
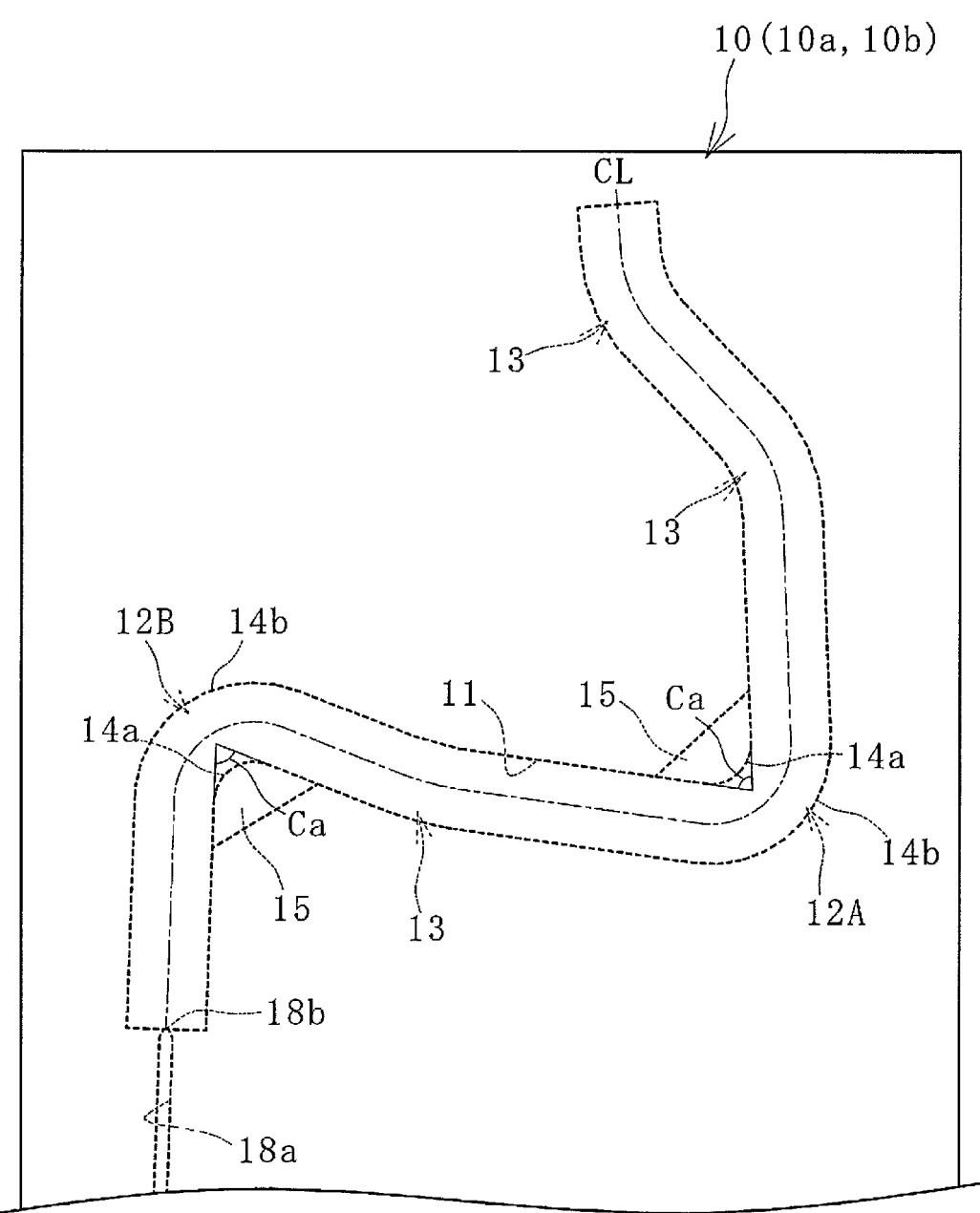
FIG. 2 is an explanatory diagram illustrating, in a plan view, a mold illustrated in FIG. 1.
Figure 3:
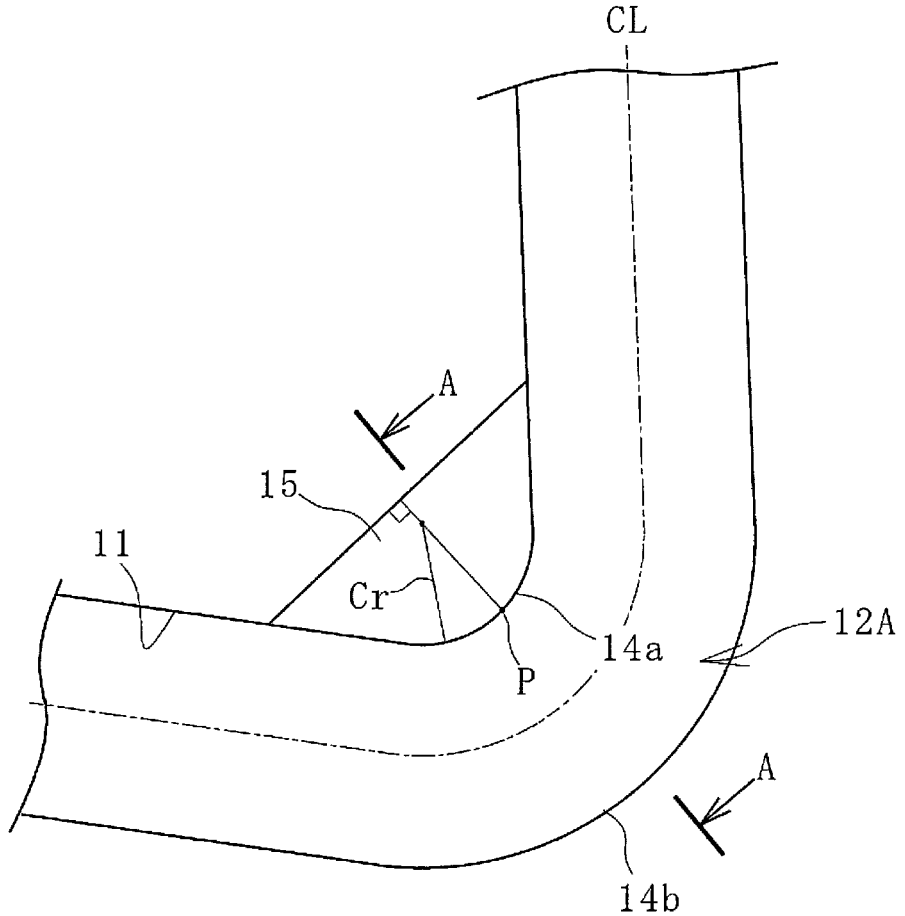
FIG. 3 is an explanatory diagram illustrating the inside of the mold as a partially enlarged view of FIG. 2.
Figure 4:
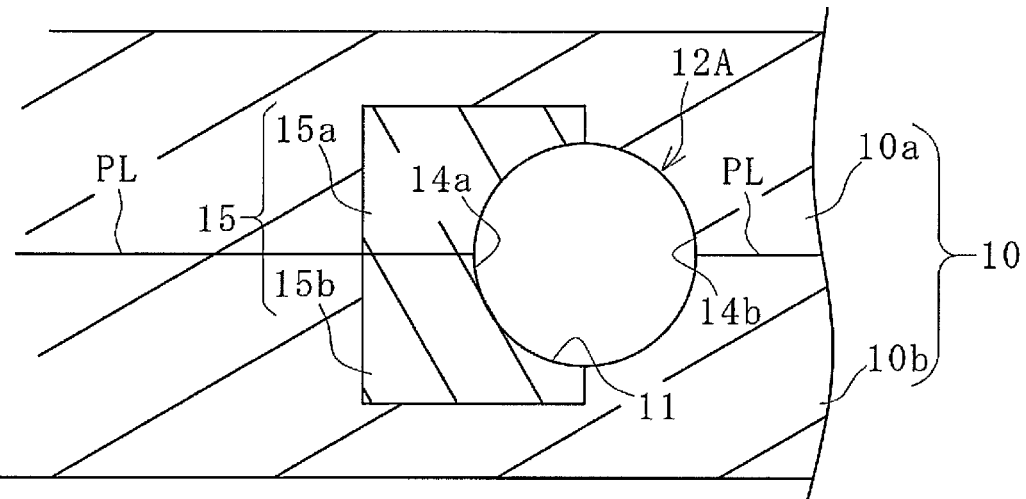
FIG. 4 is a cross-sectional view taken along a line A-A of FIG. 3.
Figure 5:
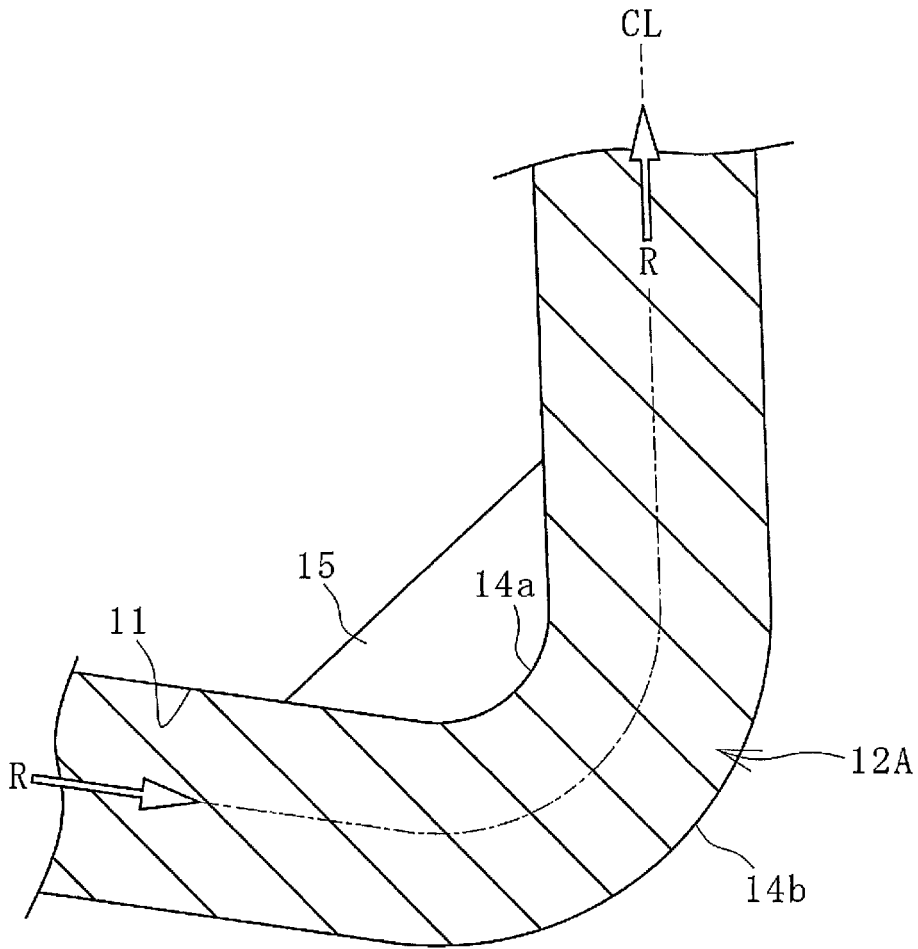
FIG. 5 is an explanatory diagram illustrating a state in which molten resin is injected into a cavity of FIG. 3.

As illustrated in FIGS. 1 and 2, in a state in which the pair of molds 10a and 10b are assembled together and closed, the molten resin R is injected from the injection molding machine 8 into the mold 10. The injected resin R is injected into the cavity 11, as illustrated in FIG. 5, through the sprue, the runner 18a, and the gate 18b that are formed in the mold 10. The cavity 11 is filled with the molten resin R.

Next, the assist material S is injected at a predetermined high pressure from the assist material injection unit 9 into the mold 10. The injected assist material S passes at high pressure through the interior of the cavity 11 filled with the injected molten resin R, in the extension direction of the cavity 11.

Figure 6:
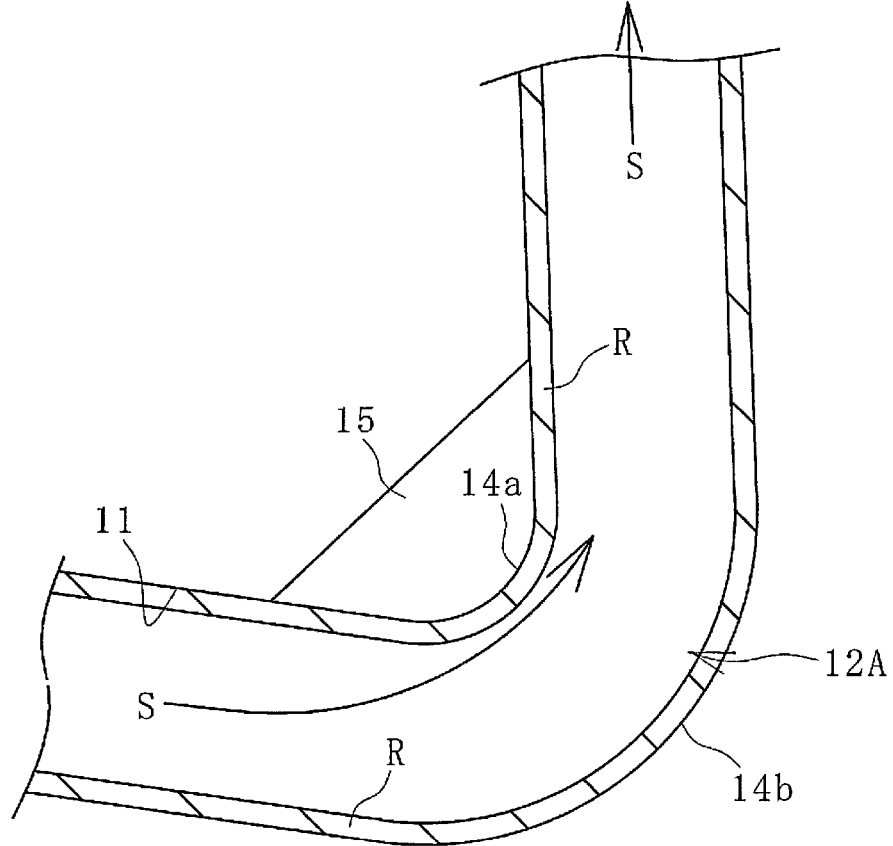
FIG. 6 is an explanatory diagram illustrating a state in which an assist material is injected into the cavity of FIG. 5.

As illustrated in FIG. 6, at the bent portion 12A, 12B of the cavity 11, the assist material S injected at high pressure tends to pass while being unevenly distributed to an inner side of the bend, which is the shortest route in the cavity 11. As a result, under normal conditions, the resin R of the bent inner portion 14a of the bent portion 12A, 12B is scraped away to a greater extent by the assist material S passing at high pressure. Therefore, the thickness of the resin R of the wall surface of the bent inner portion 14a is thinner than the thickness of the resin R of the bent outer portion 14b, resulting in the uneven thickness. To correct the uneven thickness, in this embodiment, the temperature control of the piece portion 15 is performed.

The assist material S passes through the bent portion 13 in the same manner as described above. However, since the radius of curvature Cr of the bent portion 13 is relatively large, the resin R of the wall surface of the bent inner portion 14a is less likely to be scraped away by the assist material S passing at high pressure. Therefore, in the bent portion 13, the uneven thickness of the resin R is less likely to occur, and a standard thickness can be ensured. Thus, only the bent portion 12A, 12B is selected as the portion into which the piece portion 15 is incorporated.

In this embodiment, in injecting the assist material S into the cavity 11, the temperature of the piece portion 15 is controlled by the control unit 17 to cause the bent inner portion 14a of the pre-selected bent portion 12A, 12B to have a lower temperature than the bent outer portion 14b. All portions of the cavity 11 other than the piece portion 15 are at substantially the same temperature, and in the cavity 11, only the bent inner portion 14a of the bent portion 12A, 12B is at the relatively low temperature.

By controlling the temperature of the piece portion 15 in this manner, when the assist material S passes through, the molten resin R filled in the cavity 11 becomes harder at the bent inner portion 14a than at the bent outer portion 14b. For this reason, when the assist material S passes through the bent portion 12A, 12B, even if the assist material S tends to be unevenly distributed to the bent inner portion 14a as described above, the molten resin R filled in the bent inner portion 14a is not easily scraped away (is not easily removed) by the passing assist material S.

The assist material S passing through the entire length of the cavity 11 forms the pipe passage 1a in the mold 10 by the resin R remaining in the cavity 11, and the resin R being cured causes the bent resin pipe 1 having a shape corresponding to the cavity 11 to be manufactured. In this embodiment, the resin R of the bent inner portion 14a, which is disposed so as to be relatively easily scraped away by the passing assist material S, is caused to be relatively hard, thus making it less likely to be scraped away. As a result, the uneven thickness of the resin R at the bent inner portion 14a and the bent outer portion 14b of the bent portion 12A, 12B is corrected to allow for manufacturing the bent resin pipe 1 illustrated in FIGS. 7 to 9 in which the uneven thickness at the bent inner portion 6a and the bent outer portion 6b of the bent portion 4A, 4B is more reliably corrected.

Figure 10:
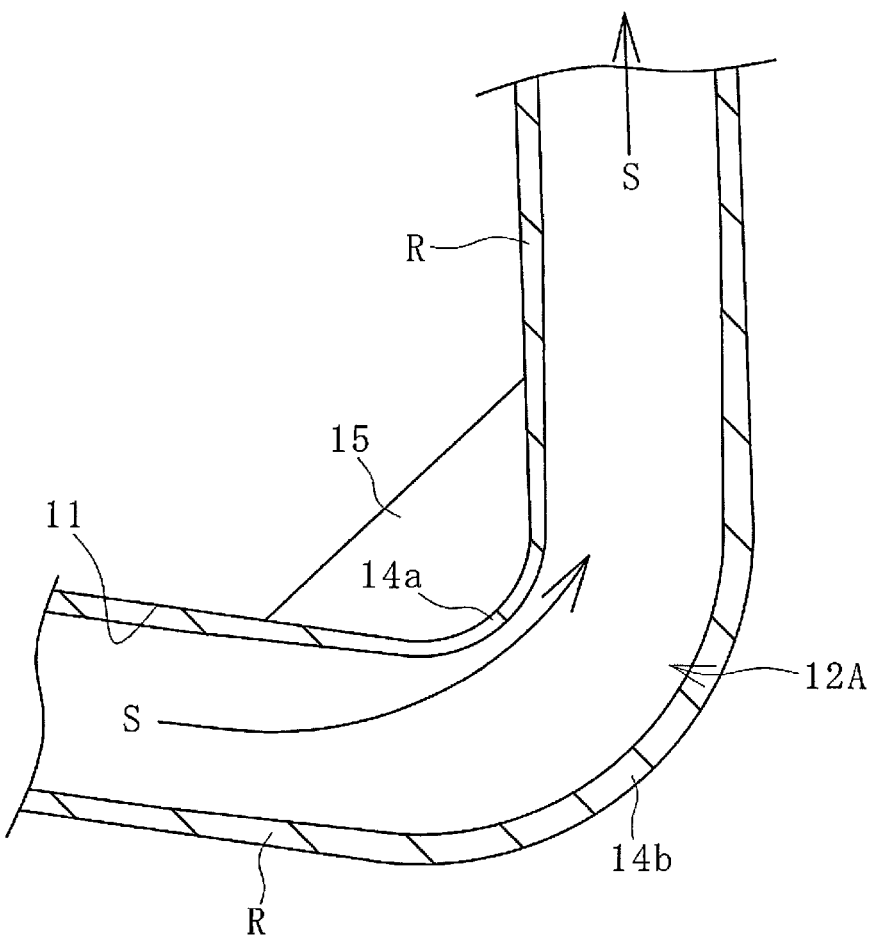
FIG. 10 is an explanatory view illustrating a state in which the assist material is injected into the cavity filled with the resin without controlling the temperature of a piece portion.
Figure 11:
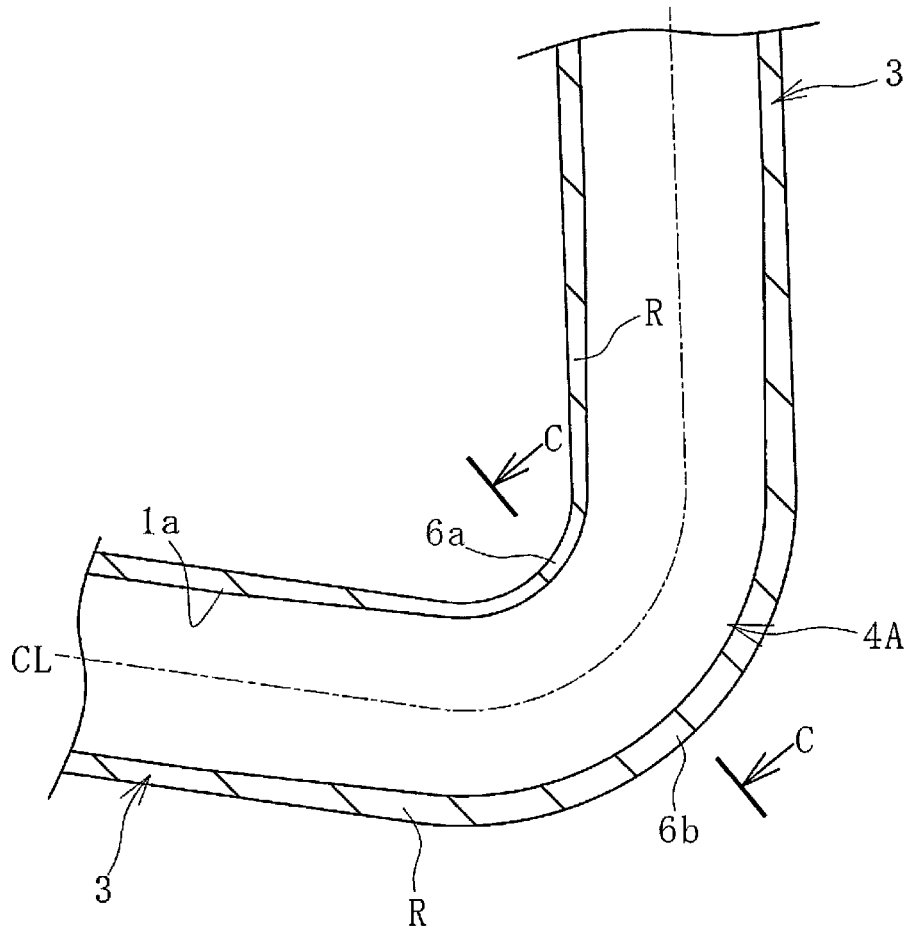
FIG. 11 is an explanatory diagram illustrating, in a plan view, the inside of a bent portion of the manufactured bent resin pipe subsequent to a step of FIG. 10.
Figure 12:
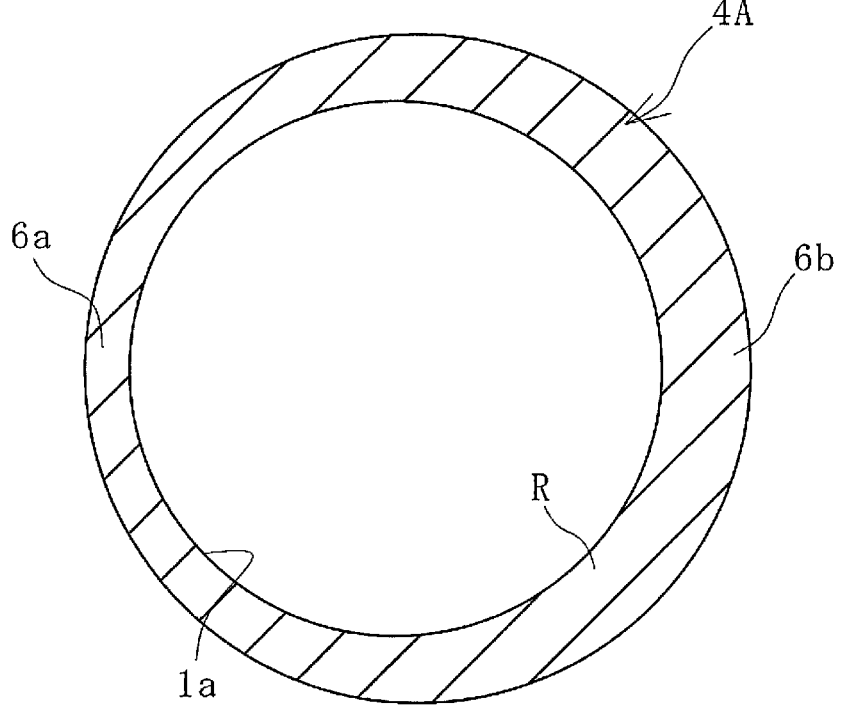
FIG. 12 is a cross-sectional view taken along a line C-C of FIG. 11.

When the bent inner portion 14a and the bent outer portion 14b of the bent portion 12A, 12B have substantially the same temperature without performing the temperature control of the piece portion 15, as illustrated in FIGS. 10 to 12, more of the resin R is scraped away by the passing assist material S at the bent inner portion 14a than at the bent outer portion 14b. Thus, the uneven thickness occurs at the bent portion 4A, 4B (12A, 12B), but an embodiment of the present invention can reduce the occurrence of such uneven thickness. Therefore, an embodiment of the present invention can also omit the rib that compensates for the insufficient thickness of the resin R at the bent inner portion 6a.

In this embodiment, the bent inner portion 14a of the bent portion 12A, 12B is cooled to cause, in injecting the assist material S into the cavity 11, the bent inner portion 14a to have a lower temperature than the bent outer portion 14b. However, the method for controlling the temperature of the cavity 11 is not limited to this embodiment. If a temperature is within a range in which the non-defective bent resin pipe 1 can be manufactured, the bent inner portion 14a may be caused to have a lower temperature than the bent outer portion 14b in injecting the assist material S into the cavity 11 by, for example, additionally heating the bent outer portion 14b of the bent portion 12A, 12B. This temperature control also causes the molten resin R filled in the cavity 11 to be harder at the bent inner portion 14a than at the bent outer portion 14b. Therefore, the molten resin R filled in the bent inner portion 14a is less likely to be scraped away (less likely to be removed) by the passing assist material S.

An embodiment of the present invention can mass-produce even the bent resin pipe 1 having a complicated shape. Using the manufactured bent resin pipe 1 can have necessary pressure resistance while reducing weight as compared with a metal pipe. For example, the bent resin pipe 1 can also be manufactured having an inner diameter of 10 mm or more and 20 mm or less under an internal pressure of 5 MPa or more when in use. Since the bent resin pipe 1 can also be used as a low-pressure pipe, weight can significantly be reduced by replacing a general-purpose bent metal pipe with the bent resin pipe 1.

The temperature control of the piece portion 15 preferably sets a temperature difference between the bent inner portion 14a and the bent outer portion 14b to 20° C. or more and 40° C. or less. If the temperature difference is less than 20° C., the difference in the hardness of the molten resin R between the bent inner portion 14a and the bent outer portion 14b cannot be made large, and it is thus difficult to obtain the effect of correcting the uneven thickness at the bent portion 4A, 4B of the manufactured bent resin pipe 1. On the other hand, if the temperature difference exceeds 40° C., the fluidity of the resin R filled in the bent inner portion 14a becomes too low, or the resin R filled in the bent outer portion 14b is excessively heated to cause a problem such as burning, which increases a risk of adversely affecting the quality of the manufactured bent resin pipe 1.

To correct the uneven thickness at the bent portion 4A, 4B (12A, 12B) while having sufficient fluidity of the resin R filled in the bent inner portion 14a, the temperature of the bent inner portion 14a is preferably set to 30° C. or more and 70° C. or less and more preferably set to approximately 40° C. or more and 50° C. or less by the temperature control of the piece portion 15.

Figure 13:
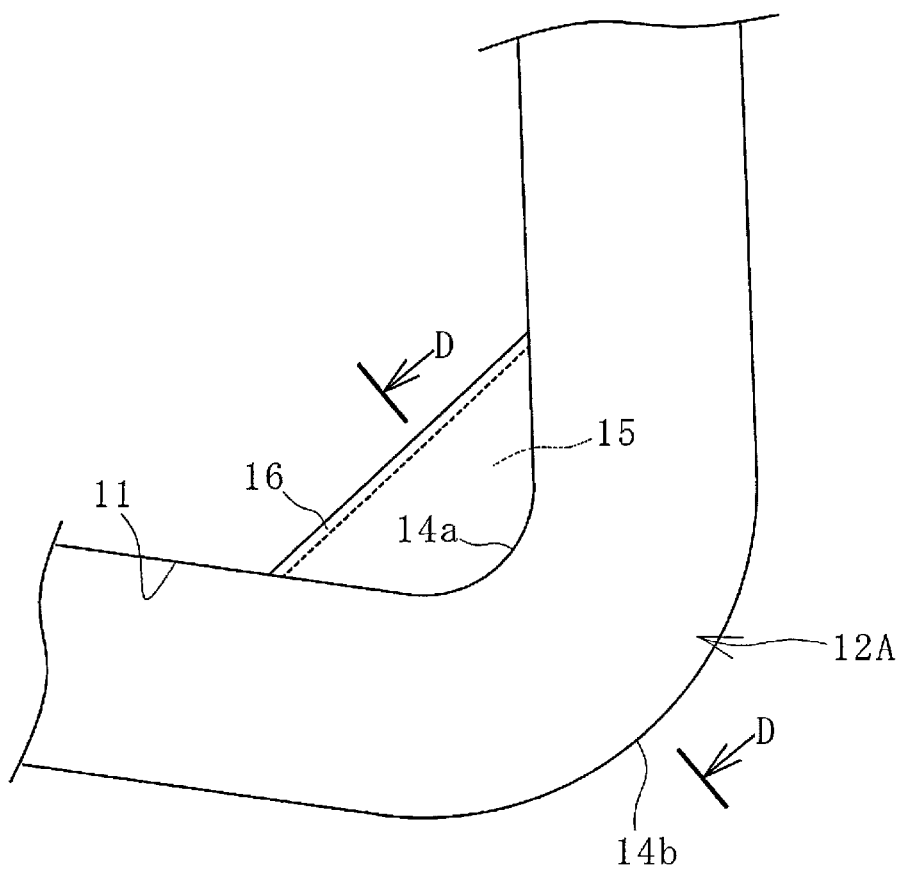
FIG. 13 is an explanatory diagram illustrating, in a plan view, a modified example of the piece portion.
Figure 14:
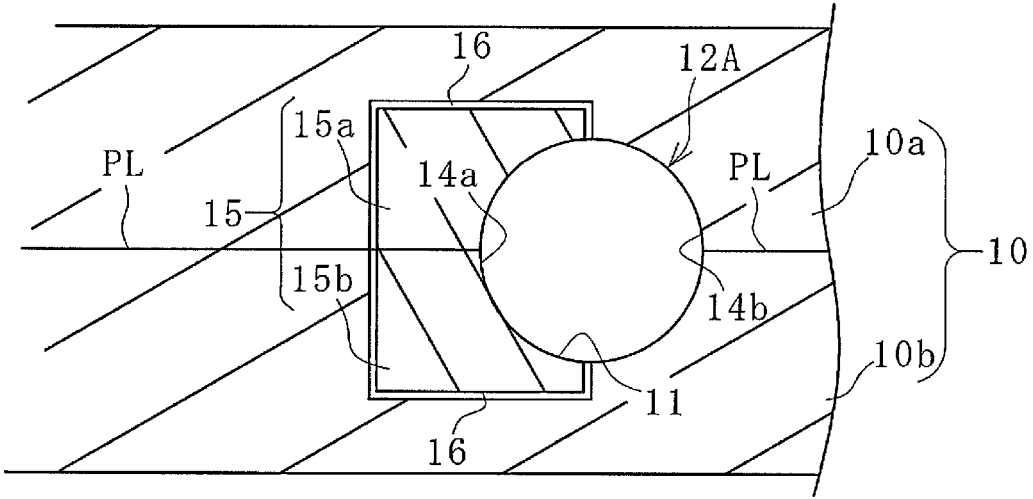
FIG. 14 is a cross-sectional view taken along a line D-D of FIG. 13.

The mold 10 having specifications illustrated in FIGS. 13 and 14 can also be used. In the mold 10, a heat insulating layer 16 is interposed between the piece portion 15 and the portions of the mold 10 other than the piece portion 15. The piece portion 15 is incorporated as a part of the mold 10 with the heat insulating layer 16 interposed therebetween.

As the heat insulating layer 16, a material is used that has a thermal conductivity lower than that of the portions of the mold 10 other than the piece portion 15. For example, when the mold 10 is formed of general carbon steel (having a thermal conductivity of approximately 49.81 W/m/C), the heat insulating layer 16 is formed using a material having a thermal conductivity lower than that of the general carbon steel. For example, the heat insulating layer 16 is formed of a known ceramic (having a thermal conductivity of approximately 0.61 W/m/C).

By interposing the heat insulating layer 16 in this manner, heat transfer between the piece portion 15 and the portions of the mold 10 other than the piece portion 15 is blocked to some extent. This makes it advantageous to reduce an influence on the piece portion 15 from the temperature of the peripheral portion of the mold 10 to quickly bring the piece portion 15 to a desired temperature and also makes it advantageous to stably maintain the piece portion 15 at the desired temperature.

REFERENCE SIGNS LIST

1 Bent resin pipe
1a Pipe passage
2 Opening portion
3 Linear portion
4 (4A, 4B) Bent portion
5 Bent portion
6a Bent inner portion
6b Bent outer portion
7 Manufacturing device
8 Injection molding machine
9 Assist material injection unit
10 (10a, 10b) Mold
11 Cavity
12 (12A, 12B) Bent portion
13 Bent portion
14a Bent inner portion
14b Bent outer portion
15 (15a, 15b) Piece portion
16 Heat insulating layer
17 Control unit
18a Runner
18b Gate
R Resin
S Assist material

The invention claimed is:

1. A method for manufacturing a bent resin pipe, the method comprising:
   manufacturing a bent resin pipe by injecting molten resin into a cavity that extends while bending and is formed in a pair of molds assembled together, subsequently injecting an assist material into the cavity, and curing the resin injected, wherein
   at least one of a bent inner portion or a bent outer portion of a pre-selected bent portion of the cavity includes a pair of temperature adjustable piece portions respectively incorporated into the pair of molds,
   a surface of one of the piece portions defines only part of the entire length of the cavity in an extension direction of the cavity formed in one of the molds,
   a surface of the other one of the piece portions defines only part of the entire length of the cavity in the extension direction of the cavity formed in the other one of the molds, and
   in injecting the assist material into the cavity, the bent inner portion being caused to have a lower temperature than the bent outer portion by using a control unit for controlling a temperature of the pair of piece portions,
   wherein a heat insulating layer is interposed between the one piece portion and portions of the one mold other than the one piece portion, and
   another heat insulating layer is interposed between the other piece portion and portions of the other mold other than the other piece portion.

2. The method for manufacturing a bent resin pipe according to claim 1, wherein a temperature difference between the bent inner portion and the bent outer portion is 20° C. or more and 40° C. or less.

3. The method for manufacturing a bent resin pipe according to claim 1, wherein a temperature of the bent inner portion is 30° C. or more and 70° C. or less.

4. The method for manufacturing a bent resin pipe according to claim 1, wherein the bent inner portion of the pre-selected bent portion has a bend angle of 90° or less and a radius of curvature of 20 mm or less.

5. A device for manufacturing a bent resin pipe, the device comprising:
   a pair of molds in which a cavity that extends while bending is formed;
   an injection molding machine configured to inject molten resin into the cavity; and
   an assist material injection unit configured to inject an assist material into the cavity into which the resin is injected;
   at least one of a bent inner portion or a bent outer portion of a pre-selected bent portion of the cavity is made up of a pair of temperature adjustable piece portions respectively incorporated into the pair of molds,
   a surface of one of the piece portions defines only part of the entire length of the cavity in the extension direction of the cavity formed in one of the molds,
   a surface of the other one of the piece portions defines only part of the entire length of the cavity in the extension direction of the cavity formed in the other one of the molds,
   a control unit configured to control the temperature of the pair of piece portions is included, and
   controlling, in injecting the assist material into the cavity, the temperature of the piece portions from the control unit causes the bent inner portion to have a lower temperature than the bent outer portion, wherein a heat insulating layer is interposed between the one piece portion and portions of the one mold other than the one piece portion, and another heat insulating layer is interposed between the other piece portion and portions of the other mold other than the other piece portion.

6. The device for manufacturing a bent resin pipe according to claim 5, wherein the pair of piece portions is formed of a metal having a higher thermal conductivity than a metal forming portions of the pair of molds other than the pair of piece portions.

7. The method for manufacturing a bent resin pipe according to claim 2, wherein a temperature of the bent inner portion is 30° C. or more and 70° C. or less.

8. The method for manufacturing a bent resin pipe according to claim 2, wherein the bent inner portion of the pre-selected bent portion has a bend angle of 90° or less and a radius of curvature of 20 mm or less.

9. The method for manufacturing a bent resin pipe according to claim 3, wherein the bent inner portion of the pre-selected bent portion has a bend angle of 90° or less and a radius of curvature of 20 mm or less.

10. The method for manufacturing a bent resin pipe according to claim 1, wherein the pair of piece portions is formed of a metal having a higher thermal conductivity than a metal forming portions of the pair of molds other than the pair of piece portions.

11. The method for manufacturing a bent resin pipe according to claim 10, wherein the pair of piece portions is formed of beryllium copper alloy.

12. The method for manufacturing a bent resin pipe according to claim 1, wherein only one of the bent inner portion or the bent outer portion is made up of the pair of piece portions.

13. The method for manufacturing a bent resin pipe according to claim 1, wherein each of the pair of piece portions constitutes a range of only 15 mm or more and 20 mm or less in the extension direction of the cavity of a bend apex of the bent inner portion or the bent outer portion of the cavity.

14. The method for manufacturing a bent resin pipe according to claim 1, wherein only the bent inner portion out of the bent inner portion and the bent outer portion is made up of the pair of piece portions.

15. The device for manufacturing a bent resin pipe according to claim 5, wherein only one of the bent inner portion or the bent outer portion is made up of the pair of piece portions.

16. The device for manufacturing a bent resin pipe according to claim 5, wherein only the bent inner portion out of the bent inner portion and the bent outer portion is made up of the pair of piece portions.

17. The method for manufacturing a bent resin pipe according to claim 1, wherein each of the pair of piece portions has a dedicated flow path therein and the temperature of each of the pair of piece portions is controlled to a desired temperature range by flowing a medium through the corresponding dedicated flow path and adjusting the temperature of the medium by a temperature controller of the control unit.

18. The device for manufacturing a bent resin pipe according to claim 5, wherein each of the pair of piece portions has a dedicated flow path through which a medium flows therein and the control unit controls the temperature of each of the pair of piece portions to a desired temperature range by adjusting the temperature of the medium flowing in the dedicated flow path.

19. The method for manufacturing a bent resin pipe according to claim 1, wherein the pair of piece portions are disposed only in a localized area of the pair of molds directly adjacent to the bent inner portion or the bent outer portion of the cavity.

* * * * *